United States Patent
Pan

(10) Patent No.: US 11,470,288 B2
(45) Date of Patent: Oct. 11, 2022

(54) ILLUMINATION SYSTEM AND PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/203,774

(22) Filed: Mar. 17, 2021

(65) Prior Publication Data
US 2021/0297639 A1    Sep. 23, 2021

(30) Foreign Application Priority Data

Mar. 18, 2020  (CN) .......................... 202020338588.2

(51) Int. Cl.
*H04N 9/31* (2006.01)
*G03B 21/20* (2006.01)

(52) U.S. Cl.
CPC ....... *H04N 9/3152* (2013.01); *G03B 21/2013* (2013.01); *G03B 21/2033* (2013.01); *G03B 21/2073* (2013.01); *H04N 9/3158* (2013.01); *H04N 9/3161* (2013.01); *H04N 9/3164* (2013.01); *H04N 9/3167* (2013.01)

(58) Field of Classification Search
CPC ............ G03B 21/2013; G03B 21/2033; G03B 21/2073; H04N 9/3152; H04N 9/3158; H04N 9/3167; H04N 9/3164

USPC ........................................................... 353/94
See application file for complete search history.

(56) References Cited

U.S. PATENT DOCUMENTS

| | | | |
|---|---|---|---|
| 2013/0100423 A1* | 4/2013 | Yamagishi | G03B 21/204 353/98 |
| 2015/0253653 A1* | 9/2015 | Fujita | G03B 21/204 353/31 |
| 2018/0173087 A1* | 6/2018 | Hsieh | G03B 21/2033 |

FOREIGN PATENT DOCUMENTS

| CN | 104641289 | 5/2015 |
|---|---|---|
| CN | 209765253 | 12/2019 |

* cited by examiner

*Primary Examiner* — Jerry L Brooks
(74) *Attorney, Agent, or Firm* — JCIPRNET

(57) ABSTRACT

An illumination system and a projection apparatus including the illumination system are provided with a rotatable light splitting module, wherein when a light splitting element rotates, a first laser beam forms a first color light through a reflecting region of the light splitting element and a light combining element during a first time period, a second laser beam passes through the light combining element to form a second color light during the second time period and the fourth time period, the first laser beam forms a third color light by the wavelength conversion module and the light combining element after passing through the transmitting region of the light splitting element during the third time period, and the first color light, the second color light and the third color light from the light combining element form an illumination beam.

18 Claims, 5 Drawing Sheets

- ☐ The transmitting region cuts into the transmission path of the first laser beam
- ▨ The reflecting region cuts into the transmission path of the first laser beam
- ▨ The first color light is transmitted to the light valve
- ▨ The second color light is transmitted to the light valve
- ⊞ The third color light is transmitted to the light valve

ILLUMINATION SYSTEM AND PROJECTION APPARATUS

CROSS-REFERENCE TO RELATED APPLICATION

This application claims the priority benefit of Chinese application serial No. 202020338588.2, filed on Mar. 18, 2020. The entirety of the above-mentioned patent application is hereby incorporated by reference herein and made a part of this specification.

BACKGROUND

Technical Field

The disclosure relates to an illumination system and projection apparatus.

Description of Related Art

Recently, projection apparatuses based on solid-state light sources such as light-emitting diodes (LEDs) and laser diodes (LDs) gradually become popular in the market. Generally, excitation light emitted from the solid-state light sources may be converted by a wavelength conversion material on a wavelength conversion module in the projection apparatus to generate converted light with different colors. In order to satisfy the requirements of color performance, a color filter module is disposed on the optical path of the projection apparatus, and the converted light outputted from the wavelength conversion module may pass through the color filter module to obtain lights of predetermined colors. A light valve modulates the color lights to produce an image beam, and the image beam is projected by a projection lens to the outside of the projection apparatus.

In addition, in order to satisfy the requirements of color performance, additional red and blue light sources are provided in the projection apparatus to obtain pure red and blue lights or to improve the performance of red and blue lights. However, the output power of the red light source is very sensitive to temperature changes, and requires higher heat dissipation conditions (in general, the temperature suitable for the red light source needs to be controlled below 45° C.). Therefore, the blue light source located in the same place as the red light source also needs to accommodate the conditions of the red light source, so that the overall heat dissipation conditions are all subject to the same restrictions, which increase the difficulty of heat dissipation and increases the system volume.

Furthermore, since the excitation light source of the projection apparatus is also a blue light source, in practice, in order to achieve the time-sequence red, green and blue (RGB) color lights, the blue light source as the excitation light source and the blue light source to obtain pure blue light are turned on at different time periods. This is also a waste of the laser light source using efficiency and further increases the cost of light sources.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an illumination system with small volume and good reliability.

The disclosure provides a projection apparatus with small volume and good reliability.

Other objects and advantages of the disclosure may be further illustrated by the technical features broadly embodied and described as follows.

In order to achieve one or a portion of or all of the objects or other objects, an embodiment of the disclosure provides an illumination system for providing an illumination beam. The illumination system comprises a first laser light source, a second laser light source, a wavelength conversion module, a rotatable light splitting module, and a light combining element. The first laser light source provides a first laser beam in a first time period and a third time period. The second laser light source provides a second laser beam in a second time period and a fourth time period. The wavelength conversion module is located on a transmission path of the first laser beam. The rotatable light splitting module comprises a first rotation axis and a light splitting element, wherein the first rotation axis is connected to the light splitting element, and the light splitting element is driven to rotation around the first rotation axis, the light splitting element is disposed on a transmission path of the first laser beam, and the light splitting element has at least one transmitting region and at least one reflecting region. The light combining element is located on the transmission path of the first laser beam and a transmission path of the second laser beam. When the light splitting element rotates around the first rotation axis, the first laser beam is guided by the reflecting region of the light splitting element and then passes through the light combining element to form a first color light during the first time period, the second laser beam passes through the light combining element to form a second color light during the second time period and the fourth time period, the first laser beam forms a third color light by the wavelength conversion module and the light combining element after passing through the transmitting region of the light splitting element during the third time period, and the first color light, the second color light and the third color light from the light combining element form the illumination beam.

In order to achieve one or a portion of or all of the objects or other objects, an embodiment of the disclosure provides a projection apparatus comprising the aforementioned illumination system, at least one light valve and a projection lens. The at least one light valve is located on a transmission path of the illumination beam, and is configured to convert the illumination beam into an image beam. The projection lens is located on the transmission path of the image beam, and is configured to project the image beam out of the projection apparatus.

Based on the above, the embodiments of the disclosure have at least one of the following advantages or effects. In the embodiments of the disclosure, the color filter wheel can be omitted due to the configuration of the rotatable light splitting module in the projection apparatus and the illumination system. Therefore, there is no problem of mixed light in the color junction area of the color filter wheel, and thus reducing the loss of brightness and achieving a 100% RGB Color Light Output Ratio (CLO). In addition, the projection apparatus and the illumination system can also be used to simplify the design of the light path, and the first laser light source can be disposed separately from the second laser light source to reduce the heat dissipation requirements, thus improving the reliability of the projection apparatus and the illumination system. The projection apparatus and the illumination system can also adjust the ratio of second color light and the third color light to first color light simultaneously by controlling the duration of the on/off time periods of the first laser light source and the second laser light source, so the color point and the color temperature of the white point of the image beam from the illumination system and the projection apparatus can be dynamically adjusted without changing other optical elements. In addition, the projection apparatus and the illumination system eliminate color breakage by adjusting the number of transmitting and reflecting regions of the light splitting element, resulting in smoother viewing quality. Furthermore, the projection apparatus and the illumination system can also be provided with a light diffusing element, a polarizing element, or an optical uniforming unit including the above, to improve the quality of the display image.

Other objectives, features and advantages of the present disclosure will be further understood from the further technological features disclosed by the embodiments of the present disclosure where there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similar, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
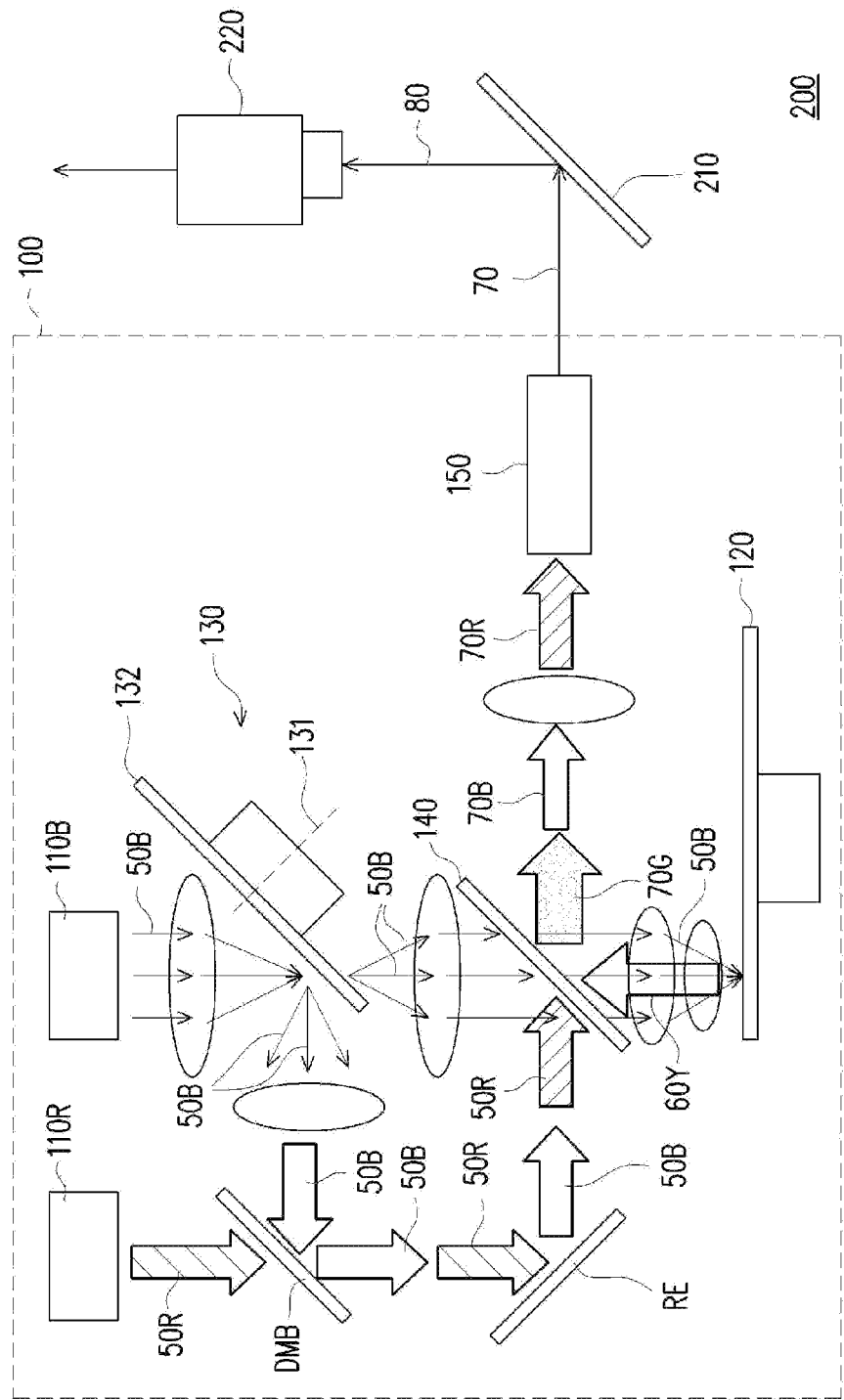
FIG. 1 is a schematic structural diagram of a projection apparatus according to an embodiment of the present application.
Figure 2A:
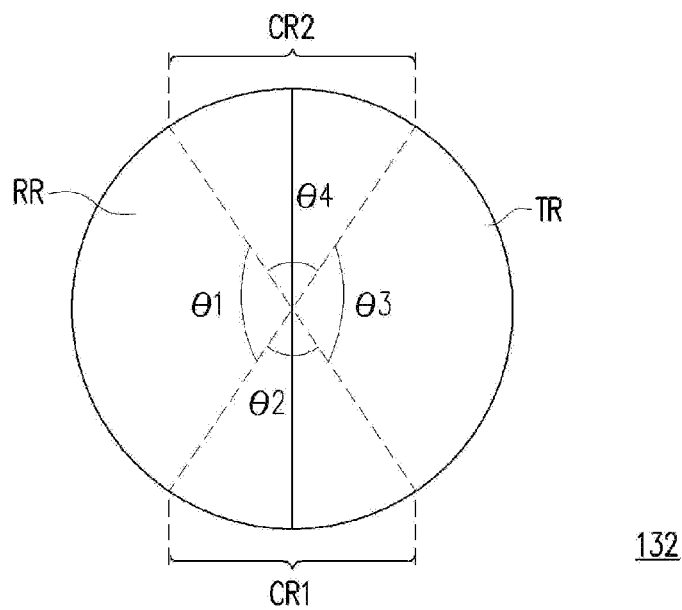
FIG. 2A is a schematic front view of a light splitting element of FIG. 1.
Figure 2B:
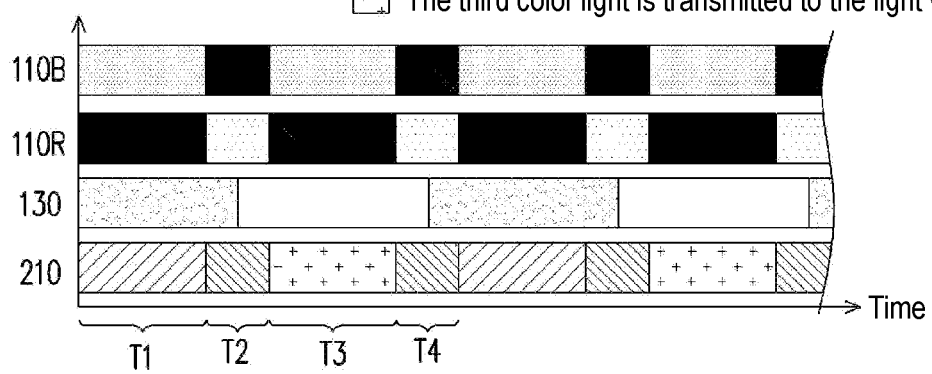
FIG. 2B is a timing diagram showing the states of a first laser light source, a second laser light source, a transmitting region and a reflecting region of a rotatable light splitting module, and a light valve of FIG. 1 in different time periods.

FIG. 1 is a schematic structural diagram of a projection apparatus according to an embodiment of the present application. FIG. 2A is a schematic front view of a light splitting element of FIG. 1. FIG. 2B is a timing diagram showing the states of a first laser light source, a second laser light source, a transmitting region and a reflecting region of a rotatable light splitting module, and a light valve of FIG. 1 in different time periods. Referring to FIG. 1, the projection apparatus 200 includes an illumination system 100, a light valve 210 and a projection lens 220. The illumination system 100 is used to provide an illumination beam 70. The light valve 210 is disposed on the transmission path of the illumination beam 70 and is used to convert the illumination beam 70 to an image beam 80. The projection lens 220 is disposed on the transmission path of the image beam 80 and is used to project the image beam 80 out of the projection apparatus 200. In this embodiment, a single light valve 210 is provided, but the application is not limited thereto. A plurality of light valves may be provided in other embodiments. Furthermore, in this embodiment, the light valve 210 may be a digital micro-mirror device (DMD) or a liquid crystal-on-silicon panel (LCOS panel). However, in other embodiments, the light valve 210 may also be a transmissive LCD panel or other image modulators.

Specifically, as shown in FIG. 1, in this embodiment, the illumination system 100 includes a first laser light source 110B, a second laser light source 110R, a wavelength conversion module 120, a rotatable light splitting module 130, a light combining element 140, and a light uniforming element 150. The first laser light source 110B is configured to provide a first laser beam 50B, and the second laser light source 110R is configured to provide a second laser beam 50R. Further, as shown in FIG. 2B, in this embodiment, the first laser light source 110B is turned on during the first time period T1 and the third time period T3, and turned off during the second time period T2 and the fourth time period T4; and, the second laser light source 110R is turned off during the first time period T1 and the third time period T3, and turned on during the second time period T2 and the fourth time period T4. As shown in FIG. 1 and FIG. 2B, during the first time period T1 and the third time period T3, the first laser light source 110B provides the first laser beam 50B, and the second laser light source 110R does not provide the second laser beam 50R. During the second time period T2 and the fourth time period T4, the second laser light source 110R provides the second laser beam 50R, while the first laser light source 110B does not provide the first laser beam 50B. For example, in this embodiment, the first laser beam 50B is a blue laser beam, and the second laser beam 50R is a red laser beam. For example, in this embodiment, the first laser light source 110B comprises a plurality of blue laser diodes arranged in an array, and the second laser light source 110R comprises a plurality of red laser diodes arranged in an array, but the disclosure is not limited thereto.

On the other hand, as shown in FIG. 1 and FIG. 2A, the rotatable light splitting module 130 includes a first rotation axis 131 and a light splitting element 132. The first rotation axis 131 is connected to the light splitting element 132. In more detail, the light splitting element 132 is, for example, in a disc shape, and the light splitting element 132 is driven to rotate around the first rotation axis 131 as a central axis. The light splitting element 132 is arranged on the transmission path of the first laser beam 50B, and is located between the first laser light source 110B and the wavelength conversion module 120. The light splitting element 132 of the rotatable light splitting module 130 has at least one transmitting region TR and at least one reflecting region RR. For example, as shown in FIG. 2A, in this embodiment, the area of the at least one transmitting region TR is the same as the area of the at least one reflecting region RR, but the invention is not limited thereto. In other embodiments not shown, the area of the at least one transmitting region TR and the area of the at least one reflecting region RR may be different.

Specifically, in this embodiment, the at least one transmitting region TR of the light splitting element 132 includes a light transmitting layer, which is capable of allowing penetration of a visible light, and the at least one reflecting region RR of the light splitting element 132 includes a light reflecting layer, which is capable of reflecting a visible light. In other embodiments, the light splitting element 132 has, for example, a light-transmitting disc plate, the at least one reflecting region RR is configured with the light reflecting layer, and at least one light-transmitting region TR is optionally configured with the light transmitting layer (or an anti-light reflecting layer). Alternatively, the light splitting element 132 may has a metal disc plate, and the at least one transmitting region TR is correspondingly, for example, a hollowed-out area, and a light-transmitting plate is mounted in the hollowed-out area. The at least one reflecting region RR can be optionally configured with the light reflecting layer. In this way, as shown in FIG. 1, FIG. 2A and FIG. 2B, when the light splitting element 132 is rotated around the first rotation axis 131, the at least one reflecting region RR of the light splitting element 132 cuts into the transmission path of the first laser beam 50B during the first time period T1, and the at least one transmission region TR of the light splitting element 132 cuts into the transmission path of the first laser beam 50B during the third time period T3, so that the first laser beam 50B is reflected to the subsequent optical element by the at least one reflecting region RR of the light splitting element 132 during the first time period T1. And, the first laser beam 50B is transmitted to the subsequent optical element by passing through the at least one transmitting region TR of the light splitting element 132 during the third time period T3.

Further, as shown in FIG. 1, FIG. 2A and FIG. 2B, in this embodiment, a first intermediate region CR1 and a second intermediate region CR2 are respectively provided at two connection positions between the at least one transmitting region TR and the at least one reflecting region RR. For example, the first intermediate region CR1 and the second intermediate region CR2 can be imagined as virtual regions corresponding to areas of the of light splitting element 132 when the first laser light source 110B is turned off (i.e., during the second time period T2 and the fourth time period T4). More specifically, when the first laser light source 110B is turned on, the first laser beam 50B transmits to the light splitting element 132 and forms a light path between the first laser light source 110B and the light splitting element 132, and the light splitting element 132 cuts into the light path of the first laser beam 50B emitted from the first laser light source 110B. Furthermore, during the second time period T2 and the fourth time period T4, the first intermediate region CR1 and the second intermediate region CR2 of the light splitting element 132 cut into the above light path respectively while the first laser light source 110B is turned off, and thus the first laser beam 50B does not pass through the rotatable light splitting module 130, and the first laser beam 50B is not transmitted to the subsequent optical elements, and does not form a first color light 70B and a third color light 70G which would be described as follows.

Furthermore, as shown in FIG. 1, FIG. 2A, and FIG. 2B, in this embodiment, during the second time period T2, the portion of the reflecting region RR adjacent to the first intermediate region CR1, the first intermediate region CR1, and the portion of the transmitting region TR adjacent to the first intermediate region CR1 sequentially cut into the light path of the first laser beam 50B. At the fourth time period T4, the portion of the transmitting region TR adjacent to the second intermediate region CR2, the second intermediate region CR2, and the portion of the reflecting region RR adjacent to the second intermediate region CR2 sequentially cut into the light path of the first laser beam 50B.

Next, as shown in FIG. 1, the light combining element 140 is disposed on the optical paths of the first laser beam 50B and the second laser beam 50R, and is located between the rotatable light splitting module 130 and the wavelength conversion module 120. Furthermore, the illumination system 100 also includes a dichroic mirror DMB and a reflective element RE. The dichroic mirror DMB and the reflective element RE are disposed at the transmission paths of the first laser beam 50B and the second laser beam 50R and are located on an optical path of the first laser beam 50B from the rotatable light splitting module 130 to the light combining element 140. For example, in this embodiment, the dichroic mirror DMB may have a blue light reflecting effect, which is configured to reflect the blue light and allow other colors of light (e.g., the red light) to pass through. And, the reflecting element RE provides a reflecting effect on the blue light and the red light. In this way, as shown in FIG. 1, during the first time period T1, after the first laser beam 50B reflected by the reflecting region RR of the light splitting element 132 of the rotatable light splitting module 130 is transmitted to the dichroic mirror DMB and then the reflection element RE, the first laser beam 50B is sequentially reflected by the dichroic mirror DMB and the reflection element RE and then is transmitted to the light combining element 140. And, during the second time period T2 or fourth time period T4, the second laser beam 50R provided by the second laser light source 110R passes through the dichroic mirror DMB and is reflected by the reflective element RE to transmit to the light combining element 140.

On the other hand, in this embodiment, the light combining element 140 is, for example, a dichroic mirror with a green light reflection effect, which is configured to allow the blue light and the red light to pass through and reflect the green light. In this way, during the first time period T1, the second time period T2 or the fourth time period T4, the first laser beam 50B and the second laser beam 50R sequentially transmitted to the light combining element 140 pass through the light combining element 140 and then are transmitted to the subsequent optical element.

On the other hand, as shown in FIG. 1, FIG. 2A and FIG. 2B, during the third time period T3, the first laser beam 50B is transmitted to the light combining element 140 after passing through the transmitting region TR of the light splitting element 132 of the rotatable light splitting module 130. Since the light combining element 140 allows the blue first laser beam 50B to pass through, the first laser beam 50B emitted from the first laser light source 110B is transmitted to the wavelength conversion module 120 through the light combining element 140. Furthermore, as shown in FIG. 1, in this embodiment, the wavelength conversion module 120 is located on the transmission path of the first laser beam 50B coming from the light combining element 140. Also, in this embodiment, the wavelength conversion module 120 has a wavelength conversion material, and the wavelength conversion material is disposed on the wavelength conversion module 120 in an O-ring shape. For example, the wavelength conversion material may be a phosphor powder that can emit a yellow light when being excited by the blue light, so that the wavelength conversion material excited by the first laser beam 50B can emit a yellow light. Moreover, since the wavelength conversion material is formed into an enclosed ring shape, the rotation of the wavelength conversion module 120 does not need to be synchronized with the on/off time periods of the first laser light source 110B and the second laser light source 110R or the switching time of the state of the light valve 210. In this way, as long as the first laser beam 50B is transmitted to the wavelength conversion module 120, during the third time period T3, the wavelength conversion module 120 converts the first laser beam 50B into a yellow wavelength conversion beam 60Y by the wavelength conversion material, and then the wavelength conversion beam 60Y is transmitted to the light combining element 140. However, since the light combining element 140 is designed to reflect the green light, a green third color light 70G is formed after the wavelength conversion beam 60Y is reflected by the light combining element 140.

Moreover, as shown in FIG. 1, since the first laser beam 50B is converted into the wavelength conversion beam 60Y by the wavelength conversion module 120 and then directly transmitted to the light combining element 140 to form the third color light 70G, the wavelength conversion beam 60Y is not guided to the rotatable light splitting module 130, therefore, the rotatable light splitting module 130 does not need to dispose a filter area or a dichroic area, and can be directly provided with a transmitting region TR and a reflecting region RR by respectively adopting a material that reflects full-band visible light and a material that allows the penetration of full-band visible light.

In this way, as shown in FIG. 1 and FIG. 2B, when the light splitting element 132 rotates around the first rotation axis 131, during the first time period T1, the first laser beam 50B is reflected by the reflecting region RR of the light splitting element 132 and then passes through the light combining element 140 to form the first color light 70B. During the second time period T2 and fourth time period T4, the second laser beam 50R passes through the light combining element 140 to form the second color light 70R. During third time period T3, the first laser beam 50B passes through the transmission region TR of the light splitting element 132 and the light combining element 140, and the first laser beam 50B is converted into the wavelength conversion beam 60Y by the wavelength conversion module 120 and then the wavelength conversion beam 60Y is directly transmitted to the light combining element 140 to form the third color light 70G. In this embodiment, the first color light 70B is a blue light, the second color light 70R is a red light, and the third color light 70G is a green light. Hence, the first color light 70B, the second color light 70R, and the third color light 70G outputted from the light combining element 140 sequentially form illumination beams 70 with different colors in different time periods. In addition, as shown in FIG. 1, in this embodiment, the light uniforming element 150 is located on the transmission path of the illumination beam 70. In this embodiment, the light uniforming element 150 may be an integrating rod, but the disclosure is not limited thereto. In more detail, as shown in FIG. 1A, when the illumination beam 70 is transmitted to the light uniforming element 150, the light uniforming element 150 can uniformize the illumination beam 70 and transmit the same to the light valve 210.

Next, as shown in FIG. 1, the light valve 210 is located on the transmission path of the illumination beam 70 and is used to receive the illumination beam 70 and output the image beam 80. The projection lens 220 is located on the transmission path of the image beam 80 and is used to project the image beam 80 out of the projection apparatus 200 to form an image. After the illumination beam 70 is converged on the light valve 210, the light valve 210 can sequentially convert the illumination beam 70 into the image beam 80 of different colors and transmit the image beam 80 to the projection lens 220. Therefore, the image projected by the projection lens 220 forms a color image.

Moreover, as shown in FIG. 1, FIG. 2A and FIG. 2B, since the duration of the on/off time periods of the first laser light source 110B and the second laser light source 110R is controlled, an output ratio of the second color light 70R and the third color light 70G relative to the first color light 70B is synchronously adjusted. Therefore, the color point and the color temperature of the white point of the image beam 80 can be dynamically adjusted without changing the arrangement of other optical elements in the illumination system 100 and projection apparatus 200. For example, in this embodiment, the ratio of the duration of the third time period T3 to the duration of the first time period T1 is between 2 and 4, and the ratio of the duration of the second time period T2 or the fourth time period T4 to the duration of the first time period T1 is between 1 and 2.5. Furthermore, as shown in FIG. 1 and FIG. 2A, the ratio of the duration of the third time period T3 to the duration of the first time period T1 in one rotation period is substantially equal to the ratio of the central angle θ3 of the transmitting region TR of the light splitting element 132 where the first laser beam 50B passes to the central angle θ1 of the reflecting region RR of the light splitting element 132 where the first laser beam 50B is reflected. The ratio of the duration of the second time period T2 to the duration of the first time period T1 is substantially equal to the ratio of the central angle θ2 of the first intermediate region CR1 to the central angle θ1 of the reflecting region RR of the light splitting element 132 where the first laser beam 50B is reflected. The ratio of the duration of the fourth time period T4 to the duration of the first time period T1 is substantially equal to the ratio of the center angle θ4 of the second intermediate region CR2 and the center angle θ1 of the reflecting region RR of the light splitting element 132 where the first laser beam 50B is reflected. In this embodiment, the ratio of the center angle θ1, the center angle θ2, the center angle θ3, and the center angle θ4 shown in FIG. 2A is approximately (1):(1-2.5):(2-4):(1-2.5).

In this way, in this embodiment, by the configuration of the rotatable light splitting module 130 in the illumination system 100 of the projection apparatus 200, the filter color wheel is omitted from the projection apparatus 200, so as to solve the problem of mixed lights in the color boundary area of the filter color wheel and reduce the loss of brightness, and a 100% RGB color light output ratio (CLO) can be achieved. In addition, design of the optical path of the projection apparatus 200 and the illumination system 100 can also be simplified. The first laser light source 110B and the second laser light source 110R are separately disposed in the illumination system 100 to reduce the requirements for heat dissipation, thereby improving the reliability of the projection apparatus 200 and the illumination system 100. Furthermore, in the projection apparatus 200 and the illumination system 100, the output ratio of the second color light 70R and third color light 70G to the first color light 70B can be simultaneously adjusted by controlling the duration of the on/off time periods of the first laser light source 110B and the second laser light source 110R. Therefore, the color point and the color temperature of the white color point of the image beam 80 the projection apparatus 200 can be dynamically adjusted without changing the arrangement of other optical elements in the projection apparatus 200.

Figure 3A:
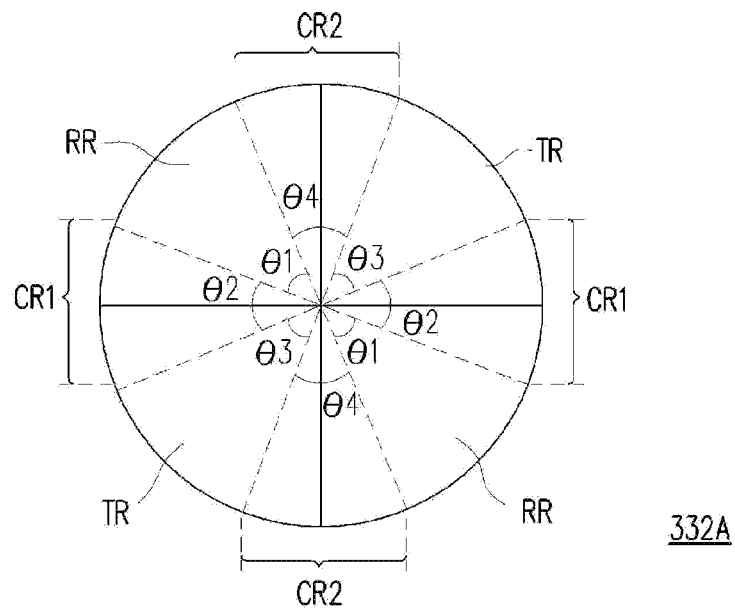
FIG. 3A is a schematic front view of another type of light splitting element of FIG. 1.
Figure 3B:
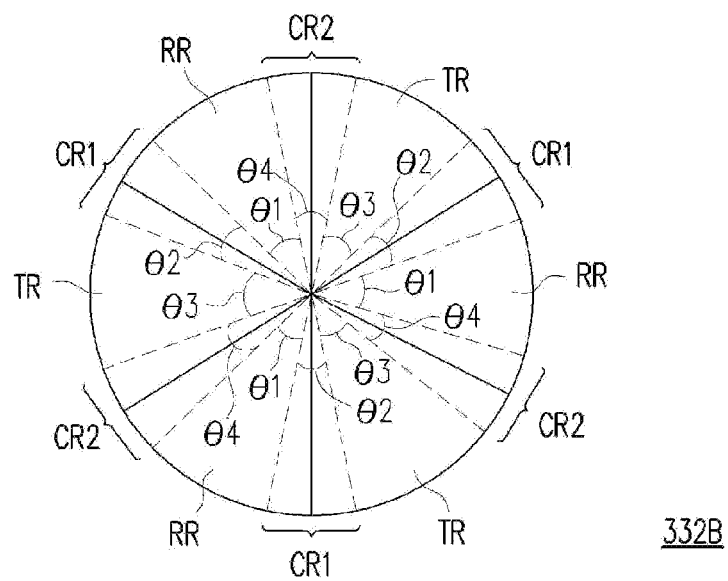
FIG. 3B is a schematic front view of further another type of light splitting element of FIG. 1.

FIG. 3A is a schematic front view of another light splitting element 132 of FIG. 1. FIG. 3B is a schematic front view of further another light splitting element 132 of FIG. 1. Referring to FIG. 3A and FIG. 3B, the light splitting elements 332A and 332B are similar to the light splitting element 132 of FIG. 2A, and the differences are as follows. In the embodiment of FIG. 2A, only one transmitting region TR and one reflecting region RR of the light splitting element 132 are shown as an example, while the disclosure is not limited thereto. In the embodiment of FIG. 3A, the light splitting element 332A includes two transmitting regions TR and two reflecting regions RR, while in the embodiment of FIG. 3B, the light splitting element 332B includes three transmitting regions TR and three reflecting regions RR. The switching frequency of on and off of the first laser light source 110B and the second laser light source 110R increases when the number of the transmitting regions TR and the reflecting regions RR of the light splitting element of the rotatable light splitting module increases; that is, the duration of the on/off time periods decreases, and the duration of the cycle period of the light valve 210 forming the image beam 80 having blue, red and green lights will be reduced accordingly. In this way, the color update rate of the projection apparatus 200 with the above light splitting elements 332A and 332B can be increased to avoid color break issues and to achieve a smoother viewing quality. However, due to various limitations, such as the swing rate of the light valve 210, the reaction time of on/off time periods of the first laser light source 110B and the second laser light source 110R, and the requirement that the areas of the transmitting region TR and the reflecting region RR of the light splitting element need to be larger than the size of the laser spot, in other embodiments of the disclosure, the number of the transmitting region TR and the reflecting region RR of the light splitting element of the rotatable light splitting module may be at most increased up to about ten respectively.

As such, when the aforementioned illumination system 100 and projection apparatus 200 adopt the light splitting elements 332A, 332B of FIG. 3A or FIG. 3B, in addition to the effects and advantages similar to those of the aforementioned illumination system 100 and projection apparatus 200, the number of transmitting region TR and reflecting region RR of the light splitting element of the rotatable light splitting module can be selectively modified depending on the user's requirements for viewing quality, to meet the actual needs.

Figure 4A:
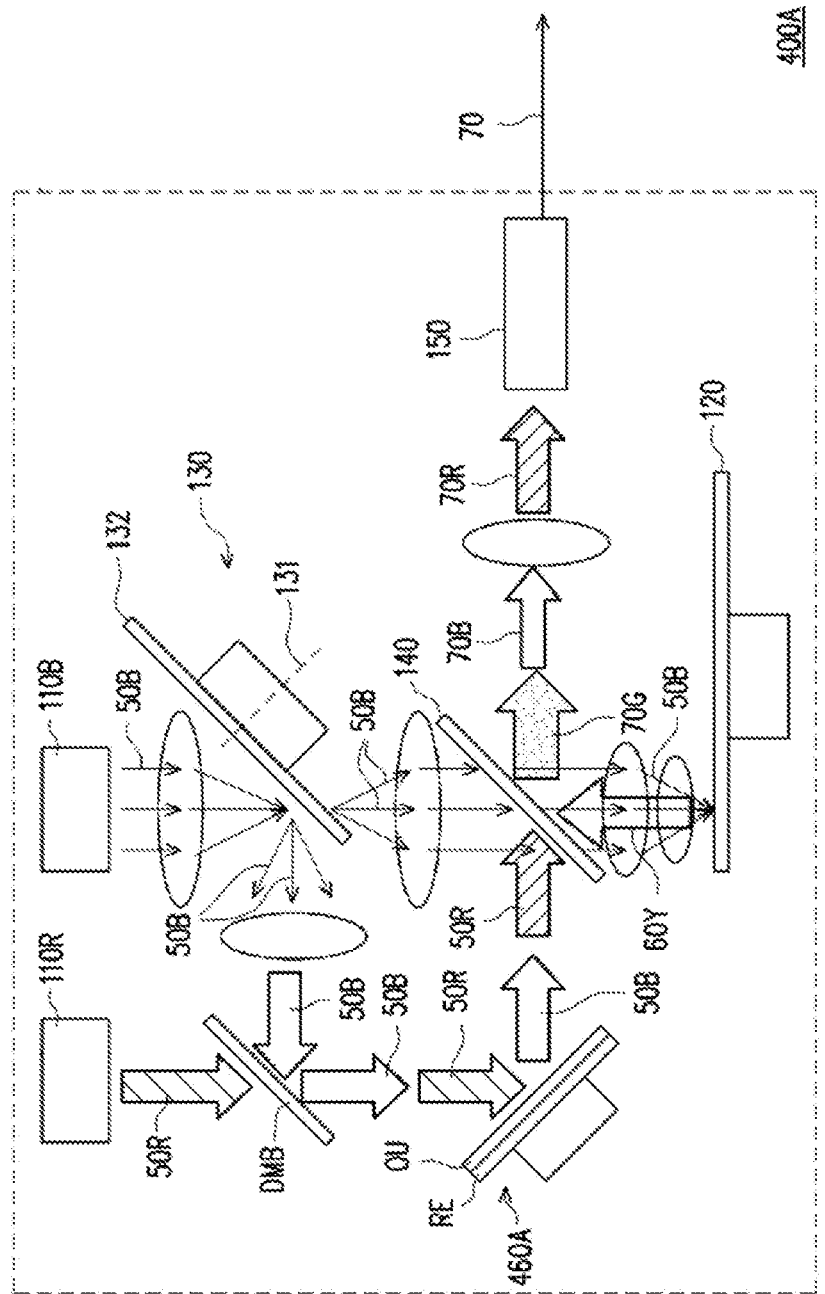
FIG. 4A is a schematic front view of another illumination system according to an embodiment of the present application.

FIG. 4A is a schematic front view of another illumination system according to an embodiment of the disclosure. The illumination system 400A of FIG. 4A is similar to the illumination system 100 of FIG. 1, and the differences are as follows. Referring to FIG. 4A, in this embodiment, the illumination system 400A further includes an optical uniforming unit OU, and the optical uniforming unit OU is disposed on the reflective element RE and on the transmission path of the first laser beam 50B and the second laser beam 50R, to form a rotatable optical module 460A. For example, the optical uniforming unit OU may include a light diffusing element, a polarizing element, or a combination of the light diffusing element and the polarizing element.

Further, when the optical uniforming unit OU includes the light diffusing element, a light diffusion effect is provided to the first laser beam 50B and the second laser beam 50R after the first laser beam 50B and the second laser beam 50R pass through the optical uniforming unit OU of the rotatable optical module 460A, so as to reduce a laser speckle. When the optical uniforming unit OU includes the polarizing element, the first laser beam 50B and the second laser beam 50R may have different polarization states at different time after passing through the rotated optical uniforming unit OU. In this way, the illumination system 400A may be applied to the projection apparatus 200 configured with a polarized stereoscopic mode to eliminate a phenomenon of uneven image color or uneven image brightness often occurred in the projection apparatus 200 configured with the polarized stereoscopic mode.

For example, in a known illumination system, the polarization of a laser beam may be destroyed by other internal optical components, so that the laser beam may have different polarization directions and the intensity become non-uniform, which causes a problem of uneven brightness of the display image projected from the projection apparatus configured with the polarized stereoscopic mode. However, in the embodiment, since the illumination beam 70 and the image beam 80 formed by the first laser beam 50B and the second laser beam 50R in the illumination system 400A may have different polarization states at different time, different lights spots may be formed along with different time points. Due to an effect of visual persistence, a brightness of a light spot on an illuminated surface observed by human eyes may be a superimposed brightness of light spots at different time points during a visual persistence time period, so that the light spots at different time points during the visual persistence time period may produce the superimposed light spot with relatively uniform brightness, and therefore the color or brightness of the display image viewed by the user may be uniform, and the user may view a stereoscopic display image with better uniformity. For example, in the embodiment, since the optical uniforming unit OU is provided on the reflective element RE, the polarizing element is preferably a quarter-wave plate, a depolarizer, a circular polarizer, or a combination of the quarter-wave plate and the circular polarizer.

Moreover, in the embodiment, the illumination system 400A may also have the advantages mentioned in the embodiments of the aforementioned illumination system 100 through the arrangement of the light splitting element 132 of the rotational light splitting module 130 of FIG. 1, and when the illumination system 400A is applied to the projection apparatus 200, the projection apparatus 200 may also achieve the aforementioned effects and advantages, which are not repeated.

Figure 4B:
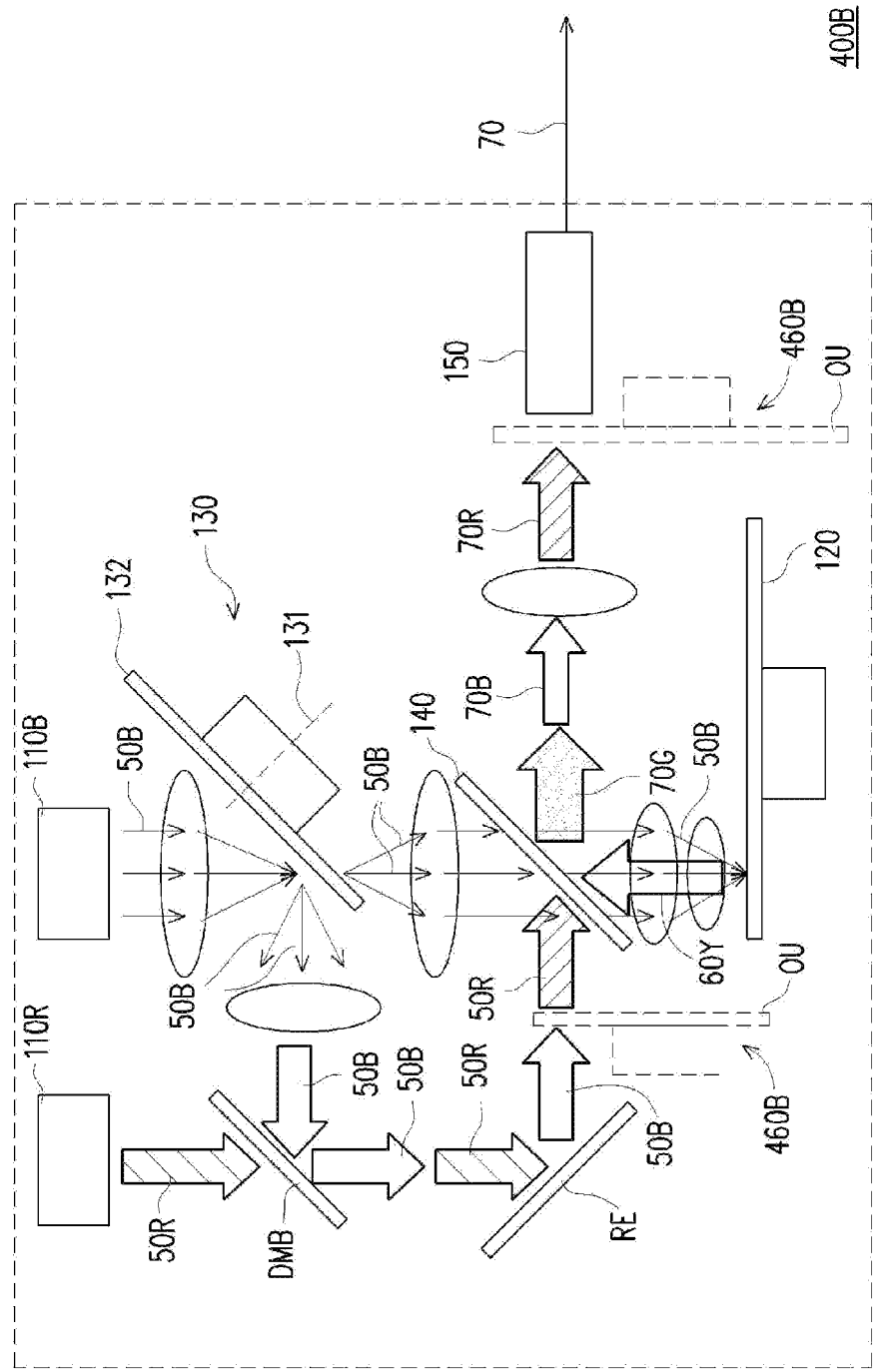
FIG. 4B is a schematic front view of further another illumination system according to an embodiment of the disclosure.

FIG. 4B is a schematic front view of further another illumination system according to an embodiment of the disclosure. The illumination system 400B of FIG. 4B is similar to the illumination system 400A of FIG. 4A, and differences there between are as follows. Referring to FIG. 4B, in the embodiments, the optical uniforming unit OU is not disposed on the reflective element RE, but is disposed between the reflective element RE and the light combining element 140, or between the light combining element 140 and the light uniforming element 150. The optical uniforming unit OU and other driving elements form an independent optical module 460B used for rotating. In other words, in the embodiment of FIG. 4A, the optical module 460A is a reflective rotating optical module, but in this embodiment, the optical module 460B is a transmissive rotating optical module. Moreover, in the embodiment, since the first laser beam 50B and the second laser beam 50R directly pass through the optical uniforming unit OU of the optical module 460B, when the optical uniforming unit OU includes a polarizing element to eliminate the phenomenon of uneven image color or uneven image brightness often occurred in the projection apparatus 200 configured with the polarized stereoscopic mode, the polarizing element may be a half-wave plate, a quarter-wave plate, a depolarizer, a circular polarizer, or a combination of the quarter-wave plate and the circular polarizer, which is preferably the half-wave plate.

In this way, in the embodiment, the illumination system 400B may also have the advantages mentioned in the embodiments of the aforementioned illumination system 100 of FIG. 1 and the illumination system 400A of FIG. 4A through the arrangement of the optical uniforming unit OU and the light splitting element 132 of the rotational light splitting module 130. And when the illumination system 400B is applied to the projection apparatus 200, the projection apparatus 200 may also achieve the aforementioned effects and advantages, which are not repeated.

In summary, the embodiments of the disclosure have at least one of the following advantages or effects. In the embodiments of the disclosure, the projection apparatus and the illumination system can omit the configuration of the color filter wheel by the arrangement of the rotatable light splitting module, so there is no problem of mixed light in the color junction areas of the color filter wheel, and the loss of brightness can be reduced, thus achieving 100% RGB color light output ratio (CLO). In addition, the projection apparatus and the illumination system can also be used to simplify the design of the light path, and the first laser light source can be arranged separately from the second laser light source to reduce the heat dissipation requirements, thus improving the reliability of the projection apparatus and the illumination system. The projection apparatus and the illumination system can also adjust the output ratio of the second color light and the third color light to the first color light simultaneously by controlling the duration of the on/off time periods of the first laser light source and the second laser light source, so the color point and the color temperature of the white point of the image beam is able to be adjusted dynamically without changing other optical elements in the illumination system and the projection apparatus. In addition, the projection apparatus and the illumination system can eliminate color breakage by adjusting the number of transmitting and reflecting regions of the light splitting element of the rotatable light splitting module, resulting in a smoother viewing quality. Furthermore, the projection apparatus and the illumination system can also be set up to improve the quality of the display image by arranging an optical uniforming unit including a light diffusing element, a polarizing element, or a combination of the above.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system for providing an illumination beam, the illumination system comprising: a first laser light source, a second laser light source, a wavelength conversion module, a rotatable light splitting module, and a light combining element, wherein, the first laser light source provides a first laser beam in a first time period and a third time period;

the second laser light source provides a second laser beam in a second time period and a fourth time period;

the wavelength conversion module is located on a transmission path of the first laser beam;

the rotatable light splitting module comprises: a first rotation axis and a light splitting element, wherein, the first rotation axis is connected to the light splitting element, and the light splitting element is driven to rotate around the first rotation axis; and the light splitting element is disposed on a transmission path of the first laser beam, and the light splitting element has at least one transmitting region and at least one reflecting region;

the light combining element is located on the transmission path of the first laser beam and a transmission path of the second laser beam, when the light splitting element rotates around the first rotation axis, the first laser beam is guided by the reflecting region of the light splitting element and then passes through the light combining element to form a first color light during the first time period, the second laser beam passes through the light combining element to form a second color light during the second time period and the fourth time period, the first laser beam forms a third color light by the wavelength conversion module and the light combining element after passing through the transmitting region of the light splitting element during the third time period, and the first color light, the second color light and the third color light from the light combining element respectively form the illumination beam; and a first intermediate region and a second intermediate region are provided between the at least one transmitting region and the at least one reflecting region, and the first intermediate region and the second intermediate region respectively cut into the transmission path of the first laser beam during the second time period and the fourth time period.

2. The illumination system according to claim 1, wherein the first laser light source is turned on during the first time period and the third time period, and turned off during the second time period and the fourth time period; and the second laser light source is turned off during the first time period and the third time period, and turned on during the second time period and the fourth time period.

3. The illumination system according to claim 1, wherein a portion of the reflecting region adjacent to the first intermediate region, the first intermediate region and a portion of the transmitting region adjacent to the first intermediate region sequentially cut into the transmission path of the first laser beam during the second time period; and a portion of the transmitting region adjacent to the second intermediate region, the second intermediate region and a portion of the reflecting region adjacent to the second intermediate region sequentially cut into the transmission path of the first laser beam during the fourth time period.

4. The illumination system according to claim 1, wherein the rotatable light splitting module is not located on the transmission path of the third color light.

5. The illumination system according to claim 1, wherein the at least one transmitting region comprises a light transmitting layer configured to allow penetration of a visible light, and the at least one reflecting region comprises a light reflecting layer configured to reflect a visible light.

6. The illumination system according to claim 1, wherein an area of the at least one transmitting region is the same as an area of the at least one reflecting region.

7. The illumination system according to claim 1, further comprising:

a light diffusing element, located on the transmission paths of the first laser beam and the second laser beam.

8. The illumination system according to claim 1, further comprising:

a polarizing element, located on the transmission paths of the first laser beam and the second laser beam.

9. An illumination system for providing an illumination beam, the illumination system comprising: a first laser light source, a second laser light source, a wavelength conversion module, a rotatable light splitting module, and a light combining element, wherein, the first laser light source provides a first laser beam in a first time period and a third time period;

the second laser light source provides a second laser beam in a second time period and a fourth time period;

the wavelength conversion module is located on a transmission path of the first laser beam;

the rotatable light splitting module comprises: a first rotation axis and a light splitting element, wherein, the first rotation axis is connected to the light splitting element, and the light splitting element is driven to rotate around the first rotation axis; and the light splitting element is disposed on a transmission path of the first laser beam, and the light splitting element has at least one transmitting region and at least one reflecting region;

the light combining element is located on the transmission path of the first laser beam and a transmission path of the second laser beam, when the light splitting element rotates around the first rotation axis, the first laser beam is guided by the reflecting region of the light splitting element and then passes through the light combining element to form a first color light during the first time period, the second laser beam passes through the light combining element to form a second color light during the second time period and the fourth time period, the first laser beam forms a third color light by the wavelength conversion module and the light combining element after passing through the transmitting region of the light splitting element during the third time period, and the first color light, the second color light and the third color light from the light combining element respectively form the illumination beam; and a ratio of a duration of the third time period to a duration of the first time period is between 2 and 4, and a ratio of a duration of the second time period or the fourth time period to the duration of the first time period is between 1 and 2.5.

10. A projection apparatus, comprising an illumination system, at least one light valve and a projection lens, wherein the illumination system is configured to provide an illumination beam and comprises: a first laser light source, a second laser light source, a wavelength conversion module, a rotatable light splitting module, and a light combining element, wherein, the first laser light source provides a first laser beam in a first time period and a third time period;

the second laser light source provides a second laser beam in a second time period and a fourth time period;

the wavelength conversion module is located on a transmission path of the first laser beam;

the rotatable light splitting module comprises: a first rotation axis and a light splitting element, wherein, the first rotation axis is connected to the light splitting element, and the light splitting element is driven to rotation around the first rotation axis; and the light splitting element is disposed on a transmission path of the first laser beam, and the light splitting element has at least one transmitting region and at least one reflecting region;

the light combining element is located on the transmission path of the first laser beam and a transmission path of the second laser beam, when the light splitting element rotates around the first rotation axis, the first laser beam is guided by the reflecting region of the light splitting element and then passes through the light combining element to form a first color light during the first time period, the second laser beam passes through the light combining element to form a second color light during the second time period and the fourth time period, the first laser beam forms a third color light by the wavelength conversion module and the light combining element after passing through the transmitting region of the light splitting element during the third time period, and the first color light, the second color light and the third color light from the light combining element respectively form the illumination beam; and a first intermediate region and a second intermediate region are provided between the at least one transmitting region and the at least one reflecting region, and the first intermediate region and the second intermediate region respectively cut into the transmission path of the first laser beam during the second time period and the fourth time period;

the at least one light valve is located on a transmission path of the illumination beam, and is configured to convert the illumination beam into an image beam; and the projection lens is located on the transmission path of the image beam, and is configured to project the image beam out of the projection apparatus.

11. The projection apparatus according to claim 10, wherein the first laser light source is turned on during the first time period and the third time period, and turned off during the second time period and the fourth time period; and, the second laser light source is turned off during the first time period and the third time period, and turned on during the second time period and the fourth time period.

12. The projection apparatus according to claim 10, wherein a portion of the reflecting region adjacent to the first intermediate region, the first intermediate region and a portion of the transmitting region adjacent to the first intermediate region sequentially cut into the transmission path of the first laser beam during the second time period; and a portion of the transmitting region adjacent to the second intermediate region, the second intermediate region and a portion of the reflecting region adjacent to the second intermediate region sequentially cut into the transmission path of the first laser beam during the fourth time period.

13. The projection apparatus according to claim 10, wherein the rotatable light splitting module is not located on the transmission path of the third color light.

14. The projection apparatus according to claim 10, wherein the at least one transmitting region comprises a light transmitting layer configured to allow penetration of a visible light, and the at least one reflecting region comprises a light reflecting layer configured to reflect a visible light.

15. The projection apparatus according to claim 10, wherein an area of the at least one transmitting region is the same as an area of the at least one reflecting region.

16. The projection apparatus according to claim 10, wherein the illumination system further comprises:

a light diffusing element, located on the transmission paths of the first laser beam and the second laser beam.

17. The projection apparatus according to claim 10, wherein the illumination system further comprises:

a polarizing element, located on the transmission paths of the first laser beam and the second laser beam.

18. A projection apparatus, comprising an illumination system, at least one light valve and a projection lens, wherein the illumination system is configured to provide an illumination beam and comprises: a first laser light source, a second laser light source, a wavelength conversion module, a rotatable light splitting module, and a light combining element, wherein, the first laser light source provides a first laser beam in a first time period and a third time period;

the second laser light source provides a second laser beam in a second time period and a fourth time period;

the wavelength conversion module is located on a transmission path of the first laser beam;

the rotatable light splitting module comprises: a first rotation axis and a light splitting element, wherein, the first rotation axis is connected to the light splitting element, and the light splitting element is driven to rotation around the first rotation axis; and the light splitting element is disposed on a transmission path of the first laser beam, and the light splitting element has at least one transmitting region and at least one reflecting region; and the light combining element is located on the transmission path of the first laser beam and a transmission path of the second laser beam, when the light splitting element rotates around the first rotation axis, the first laser beam is guided by the reflecting region of the light splitting element and then passes through the light combining element to form a first color light during the first time period, the second laser beam passes through the light combining element to form a second color light during the second time period and the fourth time period, the first laser beam forms a third color light by the wavelength conversion module and the light combining element after passing through the transmitting region of the light splitting element during the third time period, and the first color light, the second color light and the third color light from the light combining element respectively form the illumination beam;

the at least one light valve is located on a transmission path of the illumination beam, and is configured to convert the illumination beam into an image beam; and the projection lens is located on the transmission path of the image beam, and is configured to project the image beam out of the projection apparatus, wherein a ratio of a duration of the third time period to a duration of the first time period is between 2 and 4, and a ratio of a duration of the second time period or the fourth time period to the duration of the first time period is between 1 and 2.5.

* * * * *